United States Patent [19]

La Naour et al.

[11] Patent Number: 5,536,389

[45] Date of Patent: Jul. 16, 1996

[54] PROCESS AND INSTALLATION FOR THE DESTRUCTION OF ORGANIC SOLUTES, PARTICULARLY COMPLEXING AGENTS, PRESENT IN AN AQUEOUS SOLUTION SUCH AS A RADIOACTIVE EFFLUENT

[75] Inventors: Claire La Naour, Le Grand; Philippe Moisy, Tours; Charles Madic, Thiais, all of France

[73] Assignees: Commissariat A L'Energie Atomique, Paris; Compagnie Generale Des Matieres Nucleaires, Velizy-Villacoublay, both of France

[21] Appl. No.: 400,659

[22] Filed: Mar. 8, 1995

[30] Foreign Application Priority Data

Mar. 16, 1994 [FR] France ................................ 94 03056

[51] Int. Cl.$^6$ .................................................. C02F 1/461
[52] U.S. Cl. .......................... 205/688; 205/742; 588/204
[58] Field of Search ........................... 204/131, 78, 149; 588/204; 205/688, 742, 744

[56] References Cited

U.S. PATENT DOCUMENTS

| | | | |
|---|---|---|---|
| 3,340,175 | 9/1967 | Mehl | 204/268 |
| 4,013,544 | 3/1977 | Reis et al. | 210/40 |
| 4,056,482 | 11/1977 | Schmieder et al. | 252/301.1 |
| 4,863,580 | 9/1989 | Epner | 204/269 |
| 5,320,718 | 6/1994 | Molter et al. | 204/101 |

FOREIGN PATENT DOCUMENTS

| | | |
|---|---|---|
| 0010562 | 5/1980 | European Pat. Off. |
| WO91/13029 | 9/1991 | WIPO . |
| 0567375 | 10/1993 | WIPO . |

Primary Examiner—John Niebling
Assistant Examiner—Arun S. Phasage
Attorney, Agent, or Firm—Pearne, Gordon, McCoy & Granger

[57] ABSTRACT

The invention relates to a process and an installation for the destruction of organic solutes, particularly complexing agents, present in an aqueous solution such as a radioactive effluent.

According to this process, the aqueous solution undergoes electrolysis in a cell (1) comprising a working electrode ($5_1$, $5_2$, etc.) by applying to said electrode an adequate potential for destroying the solutes by electrolytic oxidation and periodic modification takes place to the potential applied or to the passage direction of the current passing through the cell so as to periodically carry out a regeneration of the working electrode.

The solutes can be organic acids such as formic acid, dihydroxymalonic acid or oxalic acid.

12 Claims, 2 Drawing Sheets

PROCESS AND INSTALLATION FOR THE DESTRUCTION OF ORGANIC SOLUTES, PARTICULARLY COMPLEXING AGENTS, PRESENT IN AN AQUEOUS SOLUTION SUCH AS A RADIOACTIVE EFFLUENT

DESCRIPTION

The present invention relates to a process for the destruction of the organic solutes present in an aqueous solution.

More specifically, it relates to the destruction of complexing organic solutes present in radioactive aqueous effluents. These complexing organic solutes can belong to the families of carboxylic, hydroxycarboxylic, polycarboxylic, polyhydroxypolycarboxylic, aminopolycarboxylic and polyaminocarboxylic acids, such as e.g. formic, oxalic, dihydroxymalonic, citric and tartaric acids.

The development of nuclear energy has led to an increased production of effluents and radioactive waste, which must be controlled as efficiently as possible in order to protect the present and future environment, by in particular minimizing the final waste quantity corresponding to one tonne of fuel consumed by power stations. In order to achieve this objective, increasing use is being made of so-called "salt-free" reagents, which, after use, can be completely destroyed in the form of gases which can be discharged into the environment.

Thus, use is made of:

aqueous solutions constituted by mixtures of complexing organic acids containing a low concentration of reducing metal ions, for the decontamination of the primary circuits of nuclear reactors, aqueous solutions containing organic acids or their non-metallic salts or organic bases, for the regeneration treatment of the solvent from the Purex process, constituted by a tributyl phosphate (TBP) solution in an industrial mixture of aliphatic carbides and aqueous solutions containing mixtures of organic substances for the decontamination of reprocessing plant equipment.

At the end of these operations, the radioactive effluents produced must be treated with a view to the packaging of the radionuclides in solid matrixes, namely cement, bitumen, thermosetting resin or glass. The thus packaged, solid waste is stored, as a function of the category to which it belongs, either in a deep geological site, or at a surface site. No matter what the envisaged solid matrix type, it is vital to destroy all the complexing agents prior to packaging. Thus, if said complexing agents were incorporated into the solid matrixes, they would constitute a serious potential danger source as a result of their action of solubilizing radionuclides in the case of leaching of the waste packs.

The destruction of organic solutes contained in radioactive effluents can take place by the dry route, e.g. by calcination, or by the wet route, e.g. oxidation.

Calcination processes have been used for the vitrification of high activity effluents from fuel reprocessing operations. In this case, it is possible to destroy the organic compound which has been added to the solutions in order to prevent the volatilization of the ruthenium, but this procedure does not make it possible to destroy in a satisfactory manner all types of organic complexing agents. Moreover, these calcining processes suffer from the disadvantage of requiring the evaporation of all the water contained in the effluent, which requires a high energy consumption and also leads to processing difficulties with respect to the gases produced, which can contain radioactive aerosols at high temperature.

Therefore the wet route destruction processes are more interesting. Among these processes, FR-A-2 653 112 discloses a process for the destruction of organic complexing agents by oxidation using $Co^{3+}$ ions, which can be continuously generated by electrolysis of the solution. This process is satisfactory, but suffers from the disadvantage of requiring the addition of cobalt ions to the solution. A process of the same type is described in EP-A-297 738 and makes use of the action of Ag(II) ions as the intermediary for carrying out the oxidation of the waste. In this case, it is also necessary to use a porous separator between the anode and the cathode, which limits the current density which can be used and makes the processing installation more complex.

The present invention relates to a process for the destruction of organic solutes in aqueous solution not requiring the addition of an oxidizing agent and which can be performed under gentle conditions with destruction efficiencies reaching 100%.

According to the invention, the process for destroying at least one organic solute present in an electricity-conducting aqueous solution consists of subjecting the aqueous solution to electrolysis in an electrolytic cell comprising a working electrode, by applying to said working electrode an adequate potential for destroying the solute or solutes by electrolytic oxidation and periodically modifying the potential applied to the working electrode or the direction of the current intensity passing through the cell so as to periodically regenerate the working electrode.

In order to be usable in this process, the starting aqueous solution incorporating the organic solute or solutes to be destroyed must consequently conduct electric current. If it does not do so naturally, to it is added a conductive solute which does not interfere with the destruction mechanisms of the organic solute or solutes to be destroyed. Such conductive solutes can e.g. be constituted by nitric acid.

In the case of radioactive effluents, the latter generally contain nitric acid and there is no need to add to them a conductive solute.

According to the process of the invention, the organic solutes to be destroyed are oxidized on the working electrode considered as the anode, but the poisoning of said electrode by intermediate oxidation products of the organic solute to be destroyed, or the passivation of said electrode by the formation of an oxide layer is prevented, by periodically regenerating the working electrode by applying a different potential or by modifying the flow direction of the current traversing the electrolytic cell.

According to a first embodiment of the invention appropriate for performing electrolysis according to the potentiostatic mode, periodically modification takes place of the potential of the working electrode so as to carry out successive cycles, each comprising a first electrolysis stage at a potential $E_1$ for a time $t_1$ and a second electrolysis stage at a potential $E_2$ for a time $t_2$.

In this embodiment of the invention, the potential $E_1$ is chosen as a function of the nature of the solute to be destroyed in order to permit its destruction during the first stage of each cycle. During said first stage, there is a progressive poisoning of the working electrode by intermediate oxidation products of the solute and in order to give said electrode its entire efficiency, during the second stage it is subject to a potential $E_2$ for a time $t_2$, which is generally shorter than the time $t_1$ of the first stage, in order to regenerate the said electrode.

In general, the time $t_1$ of the first electrolysis stage is 20 to 1200 s and the time $t_2$ of the regeneration stage is shorter, generally between 5 and 60 s, e.g. 10 s.

The potential $E_2$ used in the second stage is chosen as a function of the organic solute to be destroyed and the products responsible for the poisoning of the working electrode. Generally, the difference between $E_1$ and $E_2$ is 0.5 to 2 V.

According to a second embodiment of the process according to the invention, electrolysis takes place according to the intensiostatic mode and, in this case, periodic reversal takes place of the current flow direction in the cell so as to perform successive cycles each comprising a first stage at a current intensity I for a time $t_1$ and a second stage at the same intensity, but with a reversed current for a time $t_2$.

This second embodiment of the process according to the invention is particularly advantageous, because by reversing the direction of the current in the cell, the first electrode is regenerated and the second electrode is used as the working electrode during this time, which also makes it participate in the destruction of the organic solute. Thus, the periodic reversal of the direction of the current necessary for destroying the poison which forms on the working electrode, does not give rise to any time loss for the destruction of the organic solute.

In this case, the times $t_1$ and $t_2$ of the two stages are preferably the same and are chosen as a function of the solute to be destroyed and the nature of the electrodes used. Times of 10 to 100 s, e.g. 30 s are generally suitable.

The current intensity passing through the cell is also chosen as a function of the organic solute to be destroyed. In general, said current intensity if 4 to 20 mA/cm$^2$.

In the two embodiments of the invention, it is possible to use working electrodes made from noble metals, e.g. platinum, iridium, gold or alloys thereof, as well as an electrolyzer not comprising a separator for isolating the anodic and cathodic compartments of the electrolyzer, due to the irreversible character of the electrochemical reactions involved in the destruction of the organic solutes.

For performing the process according to the invention, working preferably takes place at atmospheric pressure and at ambient temperature, but it is obviously also possible to use higher or lower temperatures and pressures. The process according to the invention can be performed in an electrolyzer having a simple design and under gentle conditions, so that easy production is possible.

This process is more particularly applicable to the destruction of complexing organic solutes such as carboxylic, hydroxycarboxylic, aminocarboxylic, polycarboxylic, polyhydroxypolycarboxylic, aminopolycarboxylic and polyaminopolycarboxylic acid. The oxidation of these acids leads to the formation of $Co_2$, $N_2$ (in the case of aminocarboxylic acids) and $H_2O$. Thus, these are gaseous ($Co_2$, $N_2$) or liquid ($H_2O$) compounds, which can be discharged into the environment.

As said destruction leads to the formation of hydrogen and possibly to the generation of oxygen when the organic solution has been destroyed, it is important to ventilate the electrolyzer in order to obviate explosion risks induced by the presence of these two gases.

Preferably, according to the invention, use is made of an electrolyzer able to operate as a continuous reactor, in order to ensure the progressive destruction of the organic solutes during the passage of the solution into the electrolyzer.

Moreover, according to the invention, it is possible to use an installation for the destruction by electrolysis of the organic solutes present in an aqueous solution comprising:

an enclosure having two opposite walls between which are arranged in staggered manner two series of electrodes in such a way that two consecutive electrodes of one series are separated by an electrode of the other series, means for bringing about the continuous circulation of the aqueous solution between the two series of electrodes, means for connecting the electrodes of the first series and the electrodes of the second series respectively to the two poles of a current generator and means for bringing about the circulation of a gas in the upper part of the enclosure in order to continuously eliminate therefrom the gases given off by the electrolysis process.

Such an arrangement of the electrodes can be obtained with a parallelepipedic enclosure within which the electrodes are positioned vertically, the first series of electrodes being in contact with a single side wall of the enclosure and the second series of electrodes not being in contact with said side wall, but with the opposite side wall, in order to permit a circulation of the liquid between all the electrodes. The gases produced by electrolysis are given off vertically and can be collected in a container forming a cover, which is permanently ventilated in such a way that the hydrogen content of the gaseous mixture is below the limit fixed by appropriate regulations. The gaseous ventilation flow of the electrolyzer, which can contain nitrogen oxides, is purified before being discharged into the environment.

Therefore the process according to the invention has numerous advantages, particularly for the destruction of complexing organic solutes present in radioactive effluents.

Thus, it is very safe, because the energy potential accumulated in the electrolyzer is virtually zero and is solely linked with the composition of the effluent to be treated.

The process is very efficient, because it is possible to obtain a quantitative destruction of the organic complexing agents with respect to carbon dioxide gas, water and possibly nitrogen.

It does not require the use of high pressures and/or temperatures, which is an important advantage in numerous respects, such as safety, the possibility of using conventional, easy materials for the manufacture of the electrolyzer and the very low expected corrosion for these materials, so that virtually no secondary solid wastes are produced. It does not lead to the generation of secondary solid waste.

The electrolyzer is of simple design and the process can be performed and controlled remotely in easy manner.

BRIEF DESCRIPTION OF THE DRAWINGS

Other features and advantages of the invention can be gathered from the following description of non-limitative, exemplified embodiments with reference to the attached drawings, wherein show:

FIG. 1 shows in perspective an electrolyzer suitable for performing the process according to the invention. It is possible to see that the electrolyzer 1 is parallelepipedic and has a bottom 3 on which are vertically arranged a first series of electrodes $5_1, 5_2, 5_3 \ldots 5_n$, which are only in contact with the side wall 7 of the electrolyzer and a second series of electrodes $6_1, 6_2, 6_3 \ldots 6_n$, which are only in contact with the opposite side wall 9 of the electrolyzer. Thus, between the two opposite walls 7 and 9 a path is determined for the passage of the aqueous solution to be treated in the direction indicated by the arrows. The solution to be treated can be introduced into the electrolyzer by a feed pipe 11 and recovered at the electrolyzer outlet in the pipe 13. The electrodes of the first series $5_1, 5_2 \ldots 5_n$ and the electrodes of the second series $6_1, 6_2 \ldots 6_n$ are respectively supplied with current by electric supply devices 14a, 14b located below the electrolyzer bottom 3 so as to connect the first series to one of the poles of a current generator 16 and the second series to the other pole of the current generator 16. Below the cover 18, the electrolyzer has in its upper part a space 15 for collecting the gases produced during electrolysis and which can be ventilated by the circulation of a scavenging gas introduced by the pipe 17 and discharged by the pipe 19 to a gas purification system. It is possible to perform within said electrolyzer the process according to the invention for the destruction of complexing organic solutes such as formic, oxalic and dihydroxymalonic acids. The equations corresponding to the destruction of these different solutes are as follows:

| Formic acid | | | |
|---|---|---|---|
| At anode | HCOOH | $-2e \to CO_2 2H^+$ | (1) |
| At cathode | $2H^+$ | $+2e \to H_2$ | (2) |
| Cell balance | HCOOH | $\leftrightarrows CO_2 + H_2$ | (3) |
| Oxalic acid | | | |
| At anode | HOOCCOOH | $-2e \to 2CO_2 + 2H^+$ | (4) |
| At cathode | $2H^+$ | $+2e \to H_2$ | (5) |
| Cell balance | HOOCCOOH | $\leftrightarrows 2CO_2 + H_2$ | (6) |
| Dihydroxymalonic acid | | | |
| At anode | $HOOCC(OH)_2COOH$ | $-4e \to 3CO_2 + 4H^+$ | (7) |
| At cathode | $4H^+$ | $+4e \to 2H_2$ | (8) |
| Cell balance | $HOOCC(OH)_2COOH$ | $\to 3CO_2 + 2H_2$ | (9) |

EXAMPLE 1

Destruction of the Dihydroxymalonic Acid (DHM)

In this example, the starting product is an aqueous solution having a volume of 80 ml and containing 4 mmole of DHM, having a nitric acid concentration of 0.1 mole/l and a DHM concentration of 0.05 mole/l. This solution undergoes electrolysis in a diaphragm-free electrolyzer, comprising a working electrode and an auxiliary electrode, both formed by platinum disks having a diameter of 2.5 cm, i.e. a surface of 4.91 cm². Electrolysis takes place at ambient pressure and ambient temperature, with mechanical stirring of the solution, which is also subject to a water-saturated argon bubbling in the potentiostatic mode, by applying to the working electrode a potential of 1.2 V with respect to a saturated calomel reference electrode (VCS), which corresponds to the characteristic potential for the destruction of DHM acid. Electrolysis takes 4 hours.

Figure 1:
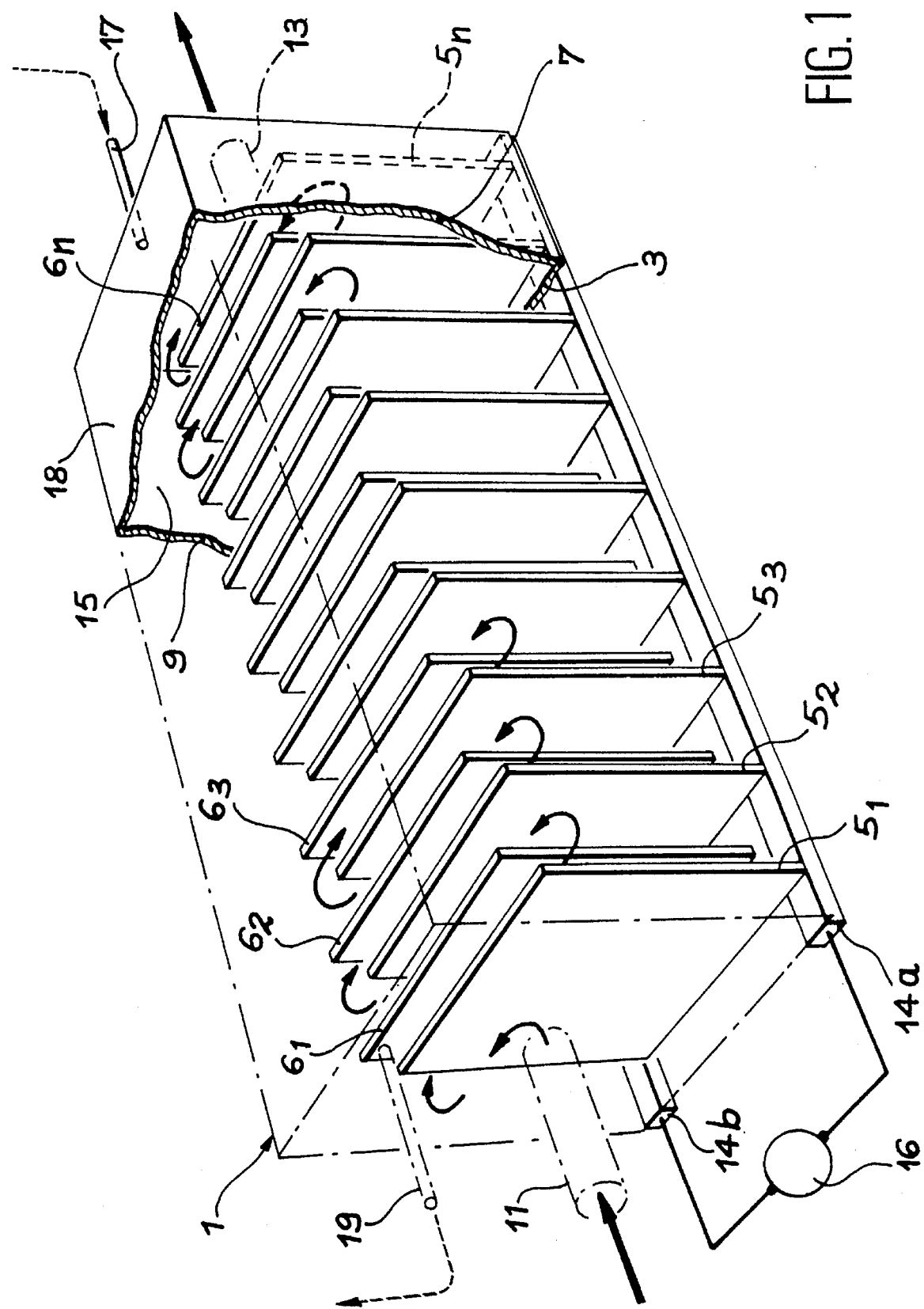
FIG. 1 In perspective an electrolyzer for performing the process of the invention.
Figure 2:
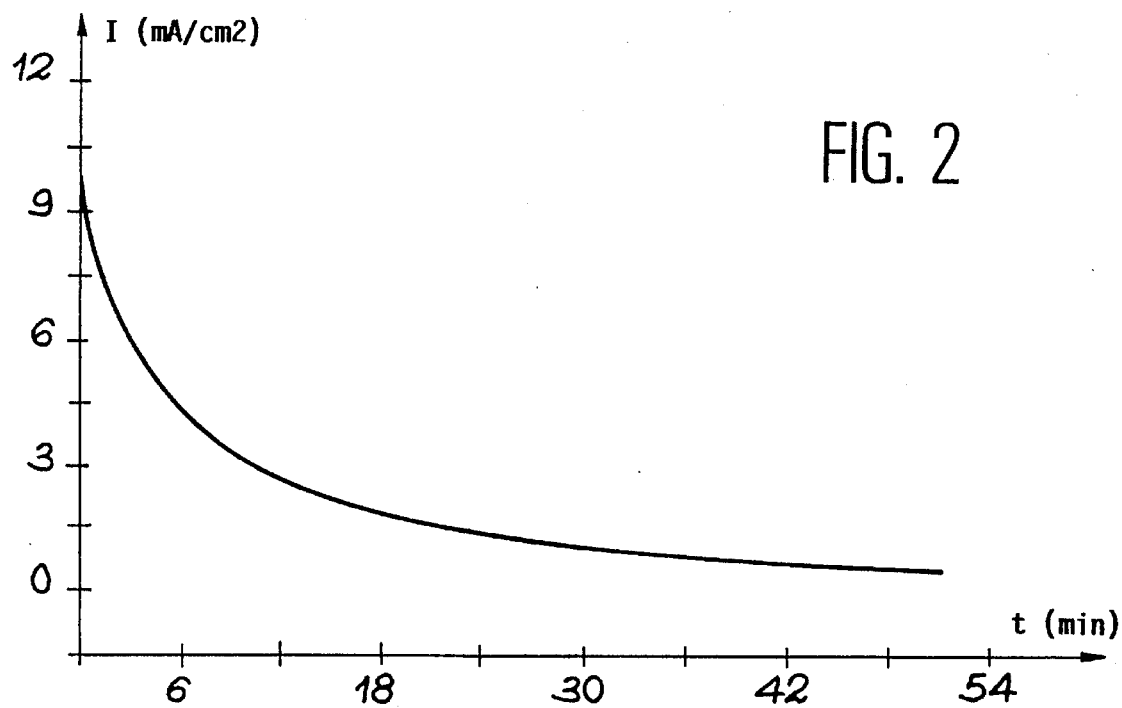
FIG. 2 A graph illustrating the variations of the electrolysis current as a function of the duration, for electrolysis performed in the potentiostatic mode, without any periodic modification of the potential applied.

FIG. 2 shows the variation of the electrolysis current, namely the current density I (in mA/cm²) as a function of time (in min.) It is possible to see that the electrolysis current drops significantly as from the start of electrolysis, which reveals the poisoning of the working electrode and does not permit a satisfactory destruction of the DHM acid. Thus, the electrolysis current reaches very low values after approximately 1 hour. After 4 hours, the destroyed DHM quantity, determined by capillary electrophoresis and by measuring the current quantity which has circulated in the electrolyzer is very low and close to 3% of the initial quantity contained in the aqueous solution.

Thus, this example demonstrates that it is not possible to destroy the organic solute without performing a periodic variation of the potential applied to the working electrode or the intensity of the current flowing through the cell for periodically regenerating the working electrode.

EXAMPLE 2

Formic Acid Destruction

In this example, electrolysis takes place of an aqueous solution having a volume of 50 ml containing 0.05 mole/l of formic acid and 0.1 mole/l of $NaClO_4$ in a diaphragm-free electrolyzer comprising a working electrode and an auxiliary electrode, each constituted by a rectangular platinum plate of length 5 cm and width 0.9 cm. Electrolysis takes place in the intensiostatic mode, accompanied by stirring and argon bubbling, as in example 1, a current intensity of 23 mA being applied. After 4 h 23 min. of operation, during which an electricity quantity of 365 coulombs has circulated in the electrolyzer, only 15.3% of the formic acid contained in the solution have been destroyed, whereas the electricity quantity used was adequate to destroy 78% thereof. In this case, as in example 2, the poisoning of the electrode is responsible for this poor result.

EXAMPLE 3

Dihydroxymalonic (DHM) Acid Destruction

In this example, the starting product is an aqueous solution having the same composition as in example 1 and its electrolysis takes place as in example 1, but the potential applied to the working electrode is varied so that it alternately operates at two different potentials, namely $E_1$ for a time $t_1$ and $E_2$ for a time $t_2$ and these cycles are repeated throughout the electrolysis period.

The conditions adopted are as follows:

$E_1 = 1.2$ V/ECS, $T_1 = 30$ s.

$E_2$=–0.4 V/ECS, $t_2$=10 s.

Figure 3:
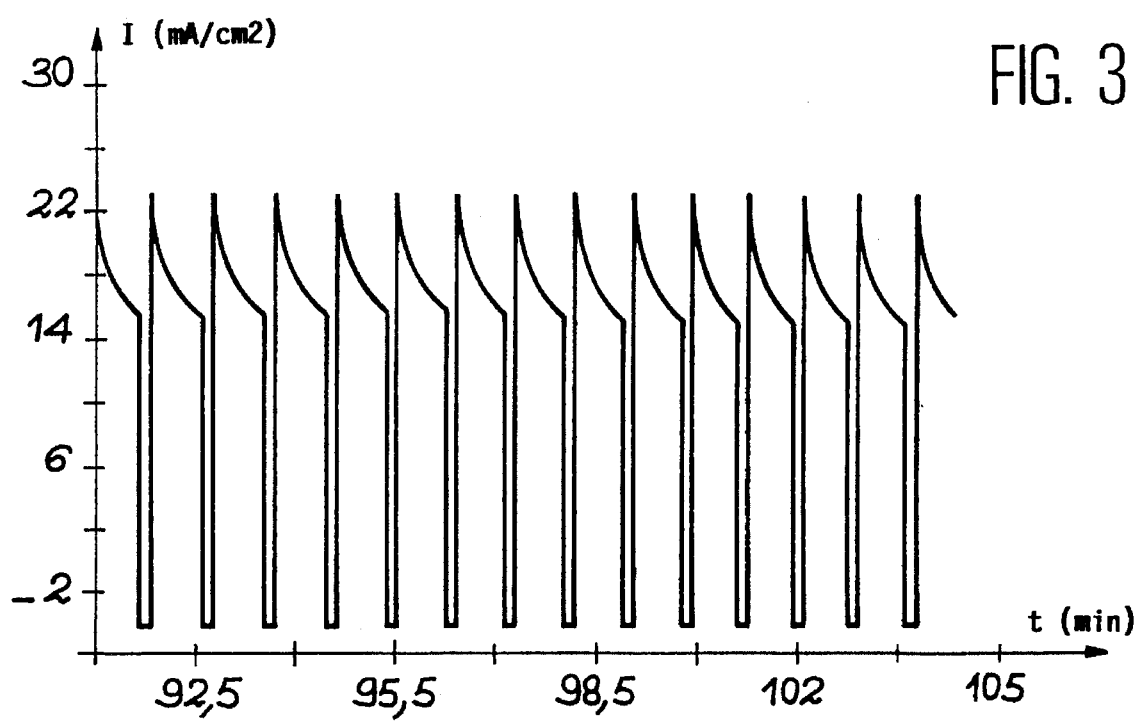
FIG. 3 A graph illustrating the variations of the electrolysis current as a function of the duration, during electrolysis performed in the potentiostatic mode with a periodic variation of the potential applied to the working electrode.

FIG. 3 illustrates the variations of the anodic current density relative to the area of a single face of the working electrode as a function of the electrolysis time, after 90 min. electrolysis.

FIG. 3 shows that the anodic current density reaches a maximum value close to 23 mA/cm² for the start of each potential cycle, when the working electrode is raised to the potential $E_1$=1.2 V/ECS and then decreases as a result of the passivation of the electrode. This maximum current density value is restored for each cycle, for the considered experimental time, after the electrode has been raised for 10 s to the potential $E_2$ of –0.4 V/ECS at which the depassivation of the electrode takes place. Thus, by the succession of said potential cycles applied to the working electrode, within the electrolytic cell a high current is maintained and the DHM acid is destroyed.

The following Table 1 shows how the DHM destruction rate varies during the electrolysis time.

TABLE 1

| TIME (min.) | DESTRUCTION RATE (%) |
| --- | --- |
| 0 | 0 |
| 35 | 5 |
| 69 | 16.5 |
| 103 | 30 |
| 139 | 40.5 |
| 203 | 59 |
| 250 | 71 |

TABLE 1-continued

| TIME (min.) | DESTRUCTION RATE (%) |
| --- | --- |
| 313 | 82 |
| 540 | 100 |

The results of Table 1 show that a destruction rate close to 100% is reached for a total duration of the experiment of about 540 min. Thus, the DHM acid destruction rate, related to the working electrode surface unit is equal to 0.9 mole/h/m².

It is pointed out that, on only taking account of the anodic current flowing in the working electrode, the faradic efficiency of DHM acid destruction is close to which was expected for an imposed potential electrolysis.

EXAMPLE 4

Formic Acid Destruction

This example follows the same operating procedure as example 3 for destroying the formic acid present in 80 ml of an aqueous solution having 0.05 mole/l of formic acid and 0.1 mole/l of NaClO$_4$, using as the working electrode a cylindrical platinum plate with a diameter of 2 cm, and a height of 2 cm, i.e. an active area of 12.56 cm², as well as an auxiliary platinum electrode constituted by a cylindrical grid having a diameter of 3.6 cm and a height of 2 cm. Electrolysis takes place in the potentiostatic mode by imposing on the working electrode the following potentials during the following times:

$E_1$=0.3 V/ECS and $t_1$=30 s, $E_2$=1.3 V/ECS and $t_2$=10 s

The results obtained after 7 h 26 min. of operation are given in the following Table 2.

EXAMPLES 5 TO 7

Formic Acid Destruction

These examples follow the same operating procedure as in example 4 for treating the same solution, but under conditions differing solely as regards to $E_1$, $t_1$ and $E_2$. The conditions used and the results obtained are also given in Table 2.

The results of Table 2 show that the values of the potential $E_1$ and $E_2$, as well as those of the times $t_1$ and $t_2$ significantly influence the formic acid destruction rate. Moreover, these results show that the faradic efficiencies are in all cases close to 100%.

TABLE 2

| EX | $E_1$ (V/ECS) | $t_1$ (s) | $E_2$ (V/ECS) | $t_2$ (s) | TOTAL TIME | CURRENT QUANTITY (c) | % ACID DESTROYED | DESTRUCTION RATE (%/h) |
| --- | --- | --- | --- | --- | --- | --- | --- | --- |
| 4 | 0.3 | 30 | 1.3 | 10 | 7h26 | 700 | 78 | 10.5 |
| 5 | 0.3 | 30 | 1 | 10 | 7h30 | 645 | 73 | 9.7 |
| 6 | 0.2 | 30 | 1 | 10 | 8h05 | 526 | 61 | 7.5 |
| 7 | 0.3 | 120 | 1 | 10 | 8h19 | 525 | 58 | 7 |

EXAMPLE 8

This example follows the same operating procedure as example 4 for destroying the oxalic acid present in an aqueous solution containing 0.05 mole/l of oxalic acid and 0.1 mole/l of NaClO$_4$, with a volume of 100 ml and using the conditions given in Table 3. In this case there is a quantitative destruction of the oxalic acid, the destruction speed being 1.6 mole/h/m² relative to the active surface of the working electrode.

Table 3 also gives the results obtained with regards to the destruction of the formic acid according to example 5 and the results obtained regarding the destruction of dihydroxymalonic acid in the case of example 3.

The results of Table 3 show that the destruction aptitude varies for said compounds in accordance with the following sequence: oxalic acid>DHM acid>formic acid.

TABLE 3

| EX | ORGANIC SOLUTE | $E_1$ (V/ECS) | $t_1$ (s) | $E_2$ (V/ECS) | $t_2$ (s) | DESTRUCTION RATE (mole/h/m$^2$) |
|---|---|---|---|---|---|---|
| 5 | Formic acid | 0.3 | 30 | 1 | 10 | 0.26 |
| 8 | Oxalic acid | 1.3 | 1200 | −0.45 | 60 | 1.6 |
| 3 | DHM acid | 1.2 | 30 | −0.4 | 10 | 0.9 |

EXAMPLE 9

Dihydroxymalonic Acid Destruction

In this example destruction takes place of the dihydroxymalonic acid present in an aqueous solution containing 0.05 mole/l of DHM acid and 0.1 mole/l of $HNO_3$, the electrolysis being performed as in example 1, but in the intensiostatic mode imposing a current of 81.5 mA and reversing the polarity of the electrodes every 30 seconds. The evolution of the DHM acid destruction rate as a function of the electrolysis time is given in Table 4.

TABLE 4

| TIME (min.) | DESTRUCTION RATE (%) |
|---|---|
| 0 | 0 |
| 41 | 8 |
| 82 | 22 |
| 123 | 37 |
| 164 | 51 |
| 206 | 65.7 |
| 247 | 77.1 |
| 308 | 86.3 |
| 330 | 100 |

This Table makes it clear that there is a quantitative destruction of the DHM acid for an electrolysis time of 330 min., which corresponds to a DHM acid destruction rate of 1.48 mole/h/m$^2$ and a faradic efficiency close to 95%.

This destruction rate is higher than that in example 3, which demonstrates that the intensiostatic operating mode with alternating polarities is more advantageous than the potentiostatic mode.

Identical results are obtained with formic and oxalic acids on carrying out electrolysis in the intensiostatic mode and reversing the polarity of the electrodes every 30 seconds.

We claim:

1. Process for the destruction of at least one organic solute present in an aqueous solution, comprising the steps of electrolyzing the aqueous solution in an electrolytic cell without a diaphragm using three electrodes including a working electrode by applying to the working electrode an adequate potential for destroying the solute or solutes by electrolytic oxidation, and periodically modifying the potential applied to the working electrode to regenerate the working electrode.

2. Process according to claim 1, characterized in that electrolysis takes place according to the potentiostatic mode and in that periodic modification takes place of the potential of the working electrode so as to perform successive cycles, each comprising a first electrolysis stage at a potential $E_1$ for a time $t_1$ and a second electrolysis stage at a potential $E_2$ for a time $t_2$.

3. Process according to claim 2, characterized in that $t_1$ is 20 to 1200 seconds.

4. Process according to claim 2, characterized in that $t_2$ is 5 to 60 seconds.

5. Process according to claim 2, characterized in that the difference between $E_1$ and $E_2$ is 0.5 to 2 V.

6. Process according to claim 1, characterized in that the organic solute is a complexing organic solute chosen from among carboxylic, hydroxycarboxylic, polycarboxylic, polyhydroxypolycarboxylic, aminocarboxylic and polyaminopolycarboxylic acids.

7. Process according to claim 6, characterized in that the complexing organic solute is formic, dihydroxymalonic or oxalic acid.

8. Process according to claim 1, characterized in that the aqueous solution is a radioactive effluent.

9. Process for the destruction of at least one organic solute present in an aqueous solution comprising the steps of electrolyzing the solution according to the intensiostatic mode in an electrolytic cell without a diaphragm and including two electrodes by applying to one of the electrodes an adequate potential for destroying the solute or solutes by electrolytic oxidation, and periodically reversing the direction of the current in the cell so as to perform successive cycles, each comprising a first stage at a current intensity I for a time $t_1$ and a second stage at the same intensity, but with a reversed current for a time $t_2$.

10. Process according to claim 9, characterized in that $t_1$ is equal to $t_2$.

11. Process according to claim 9, characterized in that $t_1$ and $t_2$ are 10 to 100 s.

12. Process according to claim 9, characterized in that the intensity of the current is 4 to 20 mA/cm$^2$.

* * * * *

UNITED STATES PATENT AND TRADEMARK OFFICE
CERTIFICATE OF CORRECTION

PATENT NO. : 5,536,389
DATED : July 16, 1996
INVENTOR(S) : Claire Le Naour et al.

It is certified that error appears in the above-indentified patent and that said Letters Patent is hereby corrected as shown below:

On the cover page, Section [75], delete "La Naour" and insert --Le Naour--.

Column 6, line 67, delete "$T_1$" and insert --$t_1$--.

Column 7, line 58, after "to" insert --100%,--.

Signed and Sealed this

Twenty-second Day of October, 1996

Attest:

BRUCE LEHMAN

Attesting Officer    Commissioner of Patents and Trademarks